(12) United States Patent
Mathew

(10) Patent No.: US 6,969,463 B2
(45) Date of Patent: *Nov. 29, 2005

(54) FUEL FILTER HOUSING

(75) Inventor: Boney A. Mathew, Clarkston, MI (US)

(73) Assignee: Mathson Industries, Troy, MI (US)

( * ) Notice: Subject to any disclaimer, the term of this patent is extended or adjusted under 35 U.S.C. 154(b) by 32 days.

This patent is subject to a terminal disclaimer.

(21) Appl. No.: 10/392,433

(22) Filed: Mar. 19, 2003

(65) Prior Publication Data
US 2003/0173280 A1 Sep. 18, 2003

Related U.S. Application Data

(62) Division of application No. 10/080,297, filed on Feb. 21, 2002, now Pat. No. 6,589,420.

(51) Int. Cl.[7] .................. B01D 35/20; B01D 35/31; B01D 27/08; B01D 35/06
(52) U.S. Cl. .................. 210/243; 210/446; 361/215
(58) Field of Search ............... 210/243, 446; 361/215

(56) References Cited

U.S. PATENT DOCUMENTS

| | | | |
|---|---|---|---|
| 3,002,870 A | * | 10/1961 | Belgarde et al. ............ 156/70 |
| 3,868,325 A | * | 2/1975 | Otto .......................... 210/232 |
| 5,076,920 A | | 12/1991 | Danowski et al. |
| 5,085,773 A | | 2/1992 | Danowski et al. |
| 5,164,084 A | | 11/1992 | Danowski et al. |
| 5,164,879 A | | 11/1992 | Danowski et al. |
| 5,382,359 A | | 1/1995 | Brandt |
| 5,500,263 A | | 3/1996 | Rober et al. |
| 5,510,160 A | | 4/1996 | Jadamus et al. |
| 5,512,342 A | | 4/1996 | Rober et al. |
| 5,798,048 A | | 8/1998 | Ries |
| 5,931,510 A | | 8/1999 | Mathew et al. |
| 6,090,459 A | | 7/2000 | Jadamus et al. |
| 6,171,492 B1 | | 1/2001 | Hedgepeth et al. |
| 6,453,870 B1 | | 9/2002 | Koller et al. |

FOREIGN PATENT DOCUMENTS

| | | | |
|---|---|---|---|
| JP | 2000-345936 A | * | 12/2000 |
| JP | 02001058369 A | | 3/2001 |

* cited by examiner

Primary Examiner—Thomas M. Lithgow
(74) Attorney, Agent, or Firm—Howard & Howard

(57) ABSTRACT

A fuel filter assembly (10) comprising an electrically non-conductive housing (12) with a layer (28) of electrically conductive material extending from the distal end (22) of an inlet connector (20) to the distal end (26) of an outlet connector (24) for conducting electrical charges completely through the housing (12) from distal end (22) to distal end (26). The housing (12) is fabricated by first forming an inlet half of the housing (12) with an opening and forming an outlet half of the housing (12) with an opening. The conductive layer (28) is disposed separately over the interior of the respective housing halves. Thereafter, the respective openings of the housing halves are fused together with the housing material fused together and the conductive layers (28) of the respective halves in electrical contact.

3 Claims, 4 Drawing Sheets

US 6,969,463 B2

FUEL FILTER HOUSING

This application is a divisional of application Ser. No. 10/080,297, filed Feb. 21, 2002 now U.S. Pat. No. 6,589,420.

BACKGROUND OF THE INVENTION

1. Field of the Invention

This invention relates a fuel filter used in the fuel line to an internal combustion engine and, more specifically, to such a fuel filter having anti-electrostatic electrical properties.

2. Description of the Prior Art

High electrostatic charges can occur in fuel line systems for supplying fuel to internal combustion engines. The discharge of such electrostatic charges can cause damage to the system. In order to alleviate this problem, both the fuel line per se and the filter housing have been made electrically conductive.

In the U.S. Pat. No. 5,798,048 to Ries the filter housing comprises an electrically nonconductive layer sandwiched between electrically conductive layers in order to provide an electrical path from the inside to the outside of the housing.

In the U.S. Pat. No. 6,171,492 to Hedgepath et al the filter housing is made of an electrically conductive material or composition for conducting electrical charges and includes a space between inner and outer walls to reduce weight and material.

The U.S. Pat. Nos. 5,076,920 and 5,164,084 to Danowski et al also teach a filter housing molded of a mixture of a plastic and an electrically conductive additive.

There remains a constant need to improve the fuel filter in terms of combinations of materials and structure with electrical conductivity.

SUMMARY OF THE INVENTION AND ADVANTAGES

The subject invention provides an improved fuel filter assembly wherein the housing is formed of an electrically non-conductive material and is characterized by a layer of electrically conductive material extending from the distal end of the inlet to the distal end of the outlet for conducting electrical charges completely through the housing from distal end to distal end.

The inlet and outlet of the fuel filter assembly of the subject invention may be connected to fuel lines which are electrically conductive to provide an electrical discharge path throughout the fuel line system.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
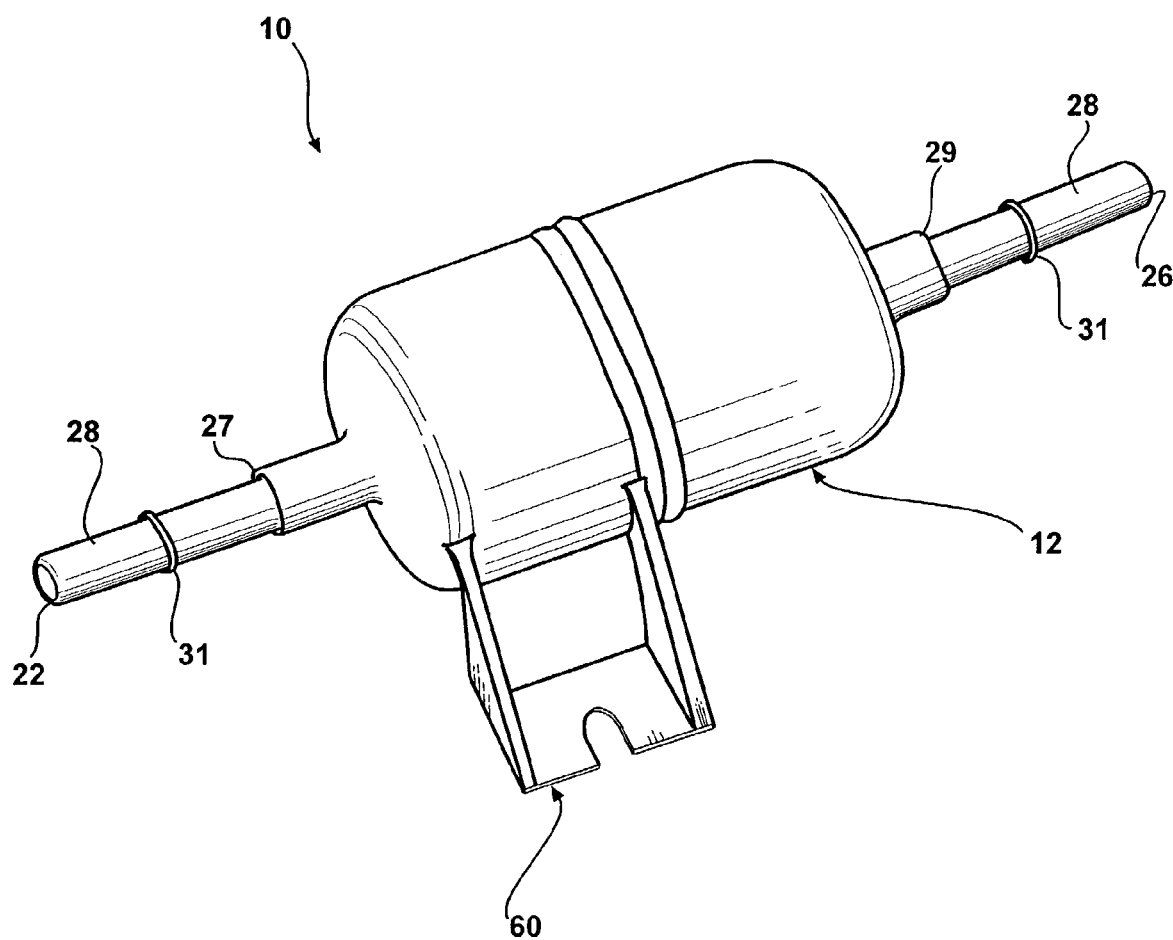
FIG. 1 is perspective view of a fuel filter assembly constructed in accordance with the subject invention.
Figure 2:
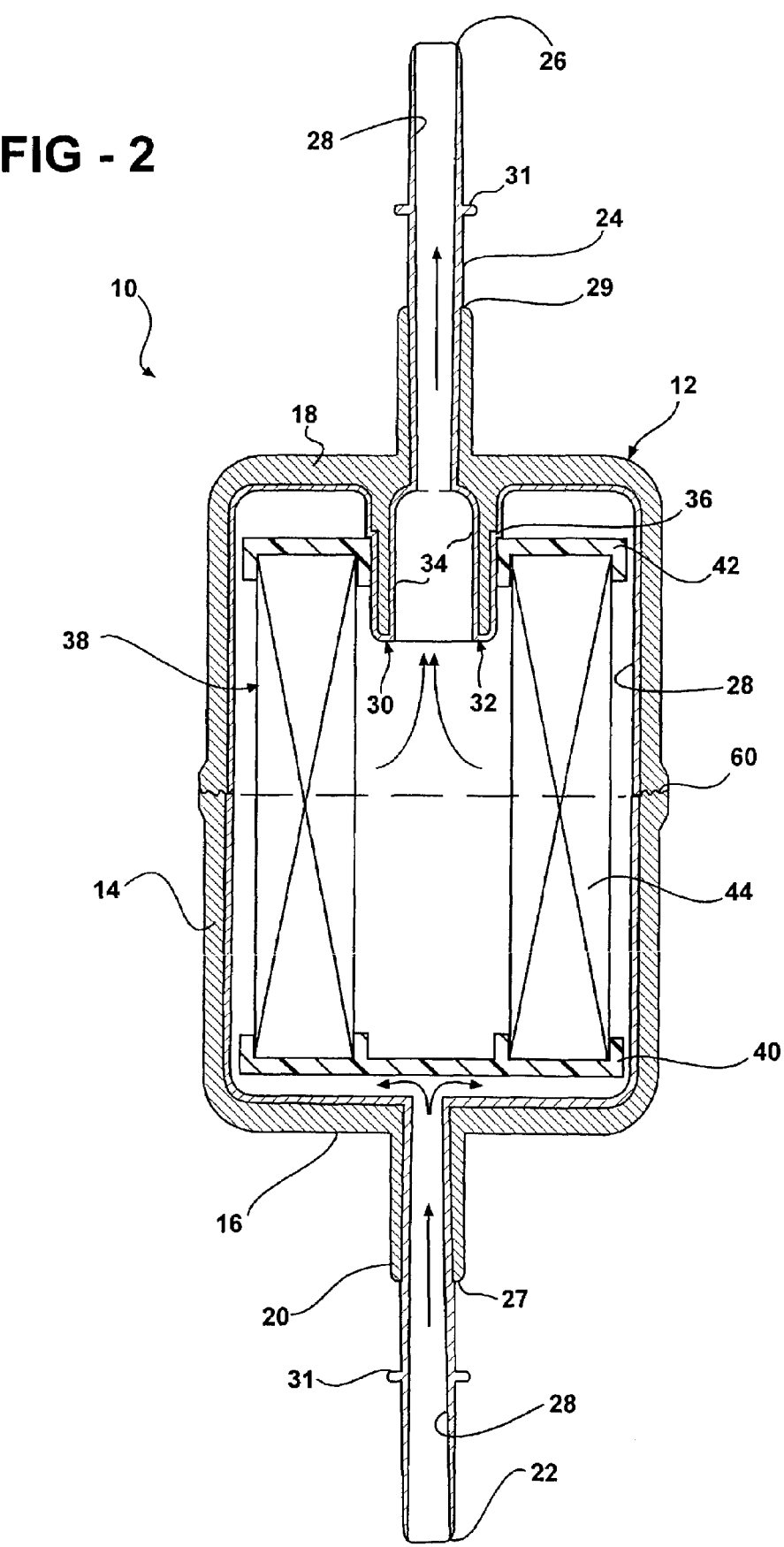
FIG. 2 is a longitudinal cross sectional view of the fuel filter assembly shown in FIG. 1.
Figure 3:
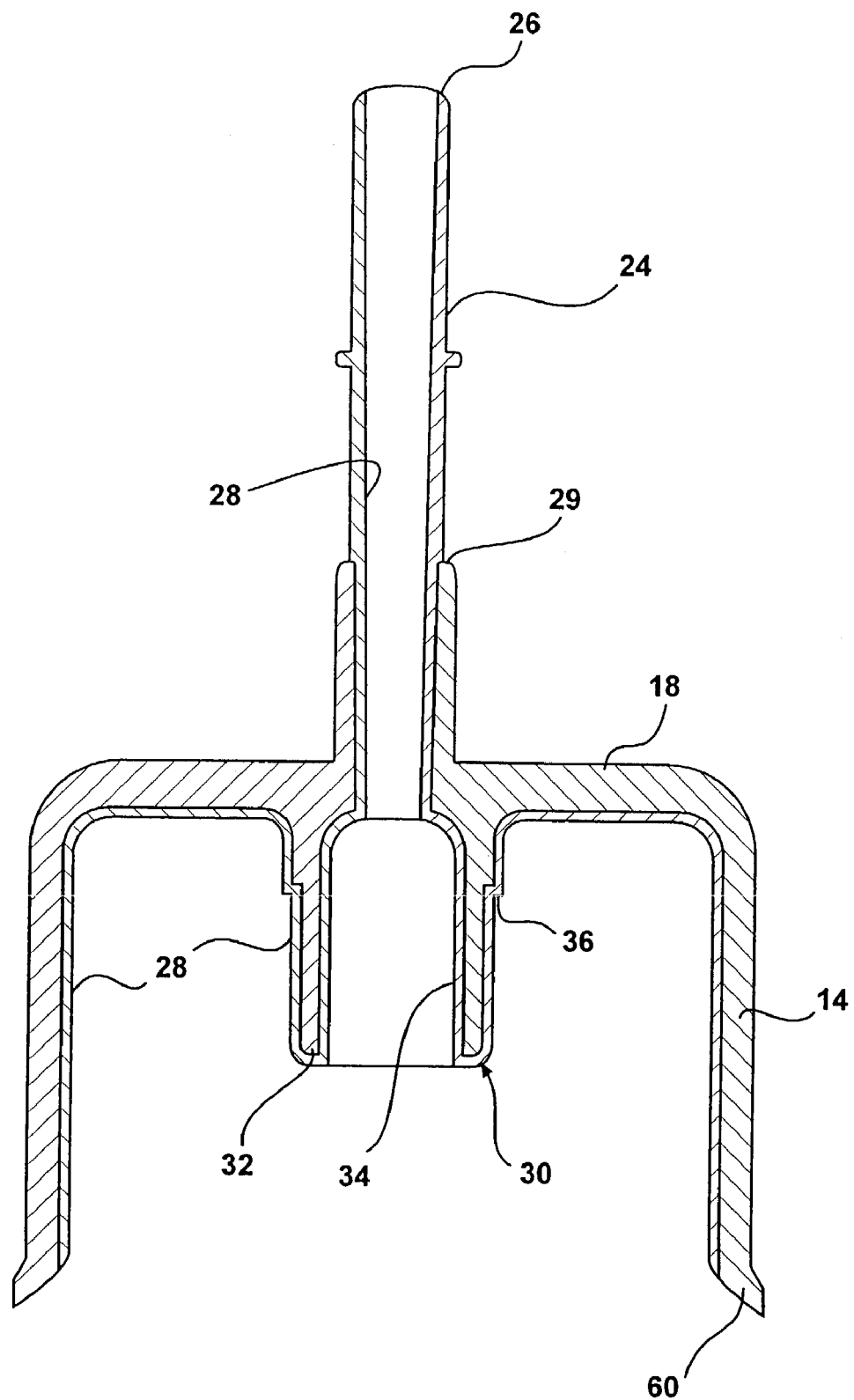
FIG. 3 is a cross sectional view like FIG. 2 but of outlet one half of the fuel filter assembly before being combined with the inlet one half.

Referring to the Figures, wherein like numerals indicate like or corresponding parts throughout the several views, a first embodiment of the fuel filter assembly of the subject invention is generally shown at 10 in FIGS. 1 and 2.

The assembly 10 includes a housing, generally indicated at 12, having a peripheral wall 14 with an interior and an exterior and extending between an inlet end 16 and an outlet end 18. The housing 12 includes an inlet connector 20 integral with and extending from the inlet end 16 of the housing 12 to an inlet distal end 22 and an outlet connector 24 integral with and extending from the outlet end 18 of the housing 12 to a distal end 26. The housing 12 comprises or consists of an electrically non-conductive material. The material of the housing 12 is a plastic or organic polymeric material. Examples of such materials include nylon, a nylon alloy, a polyethylene, thermoplastic elastomers, etc.

The assembly 10 is characterized by a layer 28 of electrically conductive material extending from the distal end 22 of the inlet connector 20 to the distal end 26 of the outlet connector 24 for conducting electrical charges completely through the housing 12 from distal end 22 to distal end 26. The conductive layer 28 covers the entire interior of the housing 12 between the distal ends 22, 26 thereof whereby any fuel flowing through the housing 12 is prevented from contacting the non-conductive material of the housings 12. The conductive material may comprise a variety of Fuel Low Permeation materials including a variety of fluoropolymers, including FEP-perfluorinated ethylene propropylene, PFA-perfluoralkoxy fluorocarbon, ETFE, and other suitable materials such as VFEP, THV sold by Dyneon. Corp., and liquid crystylline material, LCP.

The non-conductive material of the housing 12 extends along each of the inlet 20 and outlet 24 connectors to respective ends 27 and 29 that are spaced axially inwardly from the distal ends 22 and 26 whereby the conductive material is exposed axially along the ends of each of the connectors 20 and 24. Annular ribs 31 are dispersed in each of the exposed lengths of conductive material 28 for connection to fuel lines, or the like. In addition, the exposed lengths of the conductive material 28 is radially thicker between the ends 27 and 29 of the nonconductive material in the connectors 20 and 24 and the distal ends 22 and 26 of the connectors 20 and 24.

The housing 12 includes a filter support, generally indicated at 30, extending inwardly from the outlet end 18 to a rim 32 and defining an enlarged passage 34 aligned with the outlet connector 24. A shoulder 36 is formed for abutting a filter cartridge, which is generally indicated at 38. The cartridge 38 includes a disk-like inlet end piece 40 which directs the flow of fluid radially outwardly and an outlet end piece 42 which supports the cartridge 38 on the support 30 as it abuts the shoulder 36. A well-known filter material 44 extends between the end pieces 40 and 42. The fuel is forced to flow outwardly to the circumference of the filter material 44 and then radially inwardly through the filter material 44 to the center of the annular filter material 44. Thereafter, the fuel flows into the enlarged passage 34 and into the outlet connector 24 to a hose or tube.

The conductive coating 28 extends around the filter support 30, the rim 32, into the enlarged passage 34 of the filter support 30 and into the outlet connector 24 to the distal end 26 of the outlet connector 24. In this manner, no fuel is allowed to contact the material of the housing 12.

Figure 4:
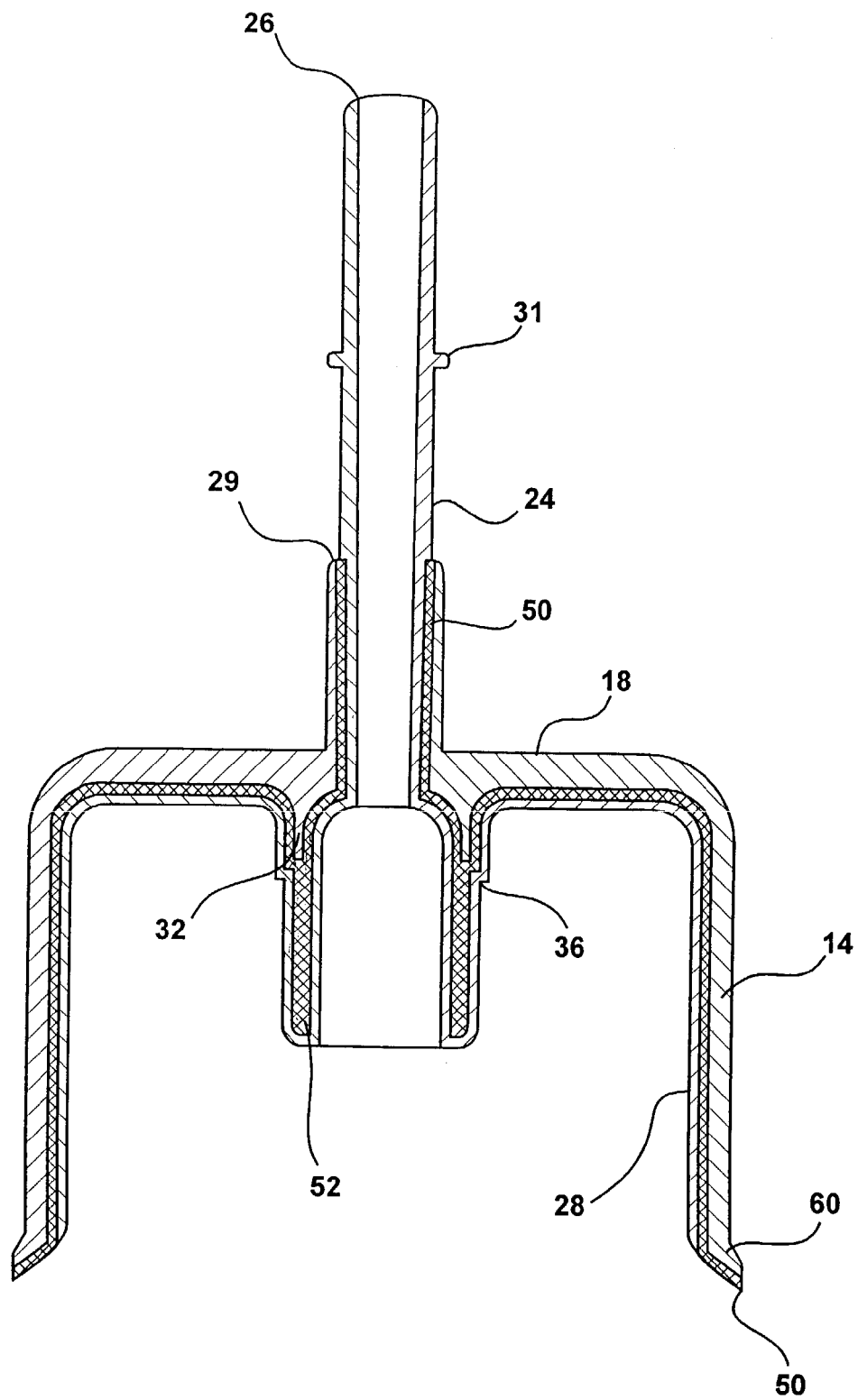
FIG. 4 is a cross sectional view like FIG. 3 but showing an alternative embodiment.

The embodiment of FIG. 4 includes a second layer 50 sandwiched between the housing 12 and the conductive layer 28. The second layer 50 comprises a non-conductive material. The second layer 50 defines an extension 52 of the rim 32.

In the embodiment of FIG. 4, the rim 32 is disposed closer to the outlet connector 24 than the shoulder 36 whereby the second layer 50 covered by the conductive layer 28 forms the extension 52, i.e., the support portion of the housing does not extend fully into the filter 38.

The non-conductive material of the housing and the second layer 50 both terminate at ends or shoulders 27 and 29 spaced inwardly from the distal ends 22, 26 of the connectors 20, 24 to expose the conductive material 28.

As will be appreciated, the filter assembly 10 may include an integrally molded or fused bracket, as generally indicated at 60 in FIG. 1 for mounting to vehicle structure.

The invention also includes a method of fabricating the fuel filter assembly 10 by forming the housing 12 of an electrically non-conductive material having a peripheral wall 14 with an interior and an exterior and extending between inlet 16 and outlet 18 ends and an inlet connector 20 integral with and extending from the inlet end 16 of the housing 12 to a distal end 22 and an outlet connector 24 integral with and extending from the outlet end 18 of the housing 12 to a distal end 26, and wherein the method is characterized by disposing a layer 28 of electrically conductive material extending from the distal end 22 of the inlet connector 20 to the distal end 26 of the outlet connector 24 for conducting electrical charges from completely through the housing 12 form distal end 22 to distal end 26.

As alluded to above, the method is further defined as forming the conductive layer 28 over the entire interior of the housing 12 between the distal ends 22, 26 thereof whereby any fuel flowing through the housing 12 is prevented from contacting the non-conductive material.

The method may continue by sandwiching a second layer 50 of non-conductive material between the housing 12 and the conductive layer 28. In the method the housing 12 is formed thicker than either of the conductive layer 28 and the second layer 50.

As illustrated in the Figures, the housing is fabricated from two halves, an inlet half and an outlet half joined together at an annular fused joint 60. The method may be further defined as forming an inlet half of the housing 12 with an opening and forming an outlet half of the housing 12 with an opening, disposing the conductive layer 28 over the interior of the respective housing halves, and fusing the respective openings of the housing halves together with the housing material fused together and the conductive layers of the respective halves in electrical contact. The halves may be fused together by spin welding, pressing, or various well-known steps.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A fuel filter assembly comprising;
a housing (12) having a peripheral wall (14) with an interior and an exterior and extending between an inlet end (16) and an outlet end (18),
said housing (12) including an inlet connector (20) integral with and extending from said inlet end (16) of said housing (12) to a distal end (22) and an outlet connector (24) integral with and extending from said outlet end (18) of said housing (12) to a distal end (26),
said housing (12) comprising an electrically non-conductive material,
a layer (28) of electrically conductive material extending from said distal end (22) of said inlet connector (20) to said distal end (26) of said outlet connector (24) for conducting electrical charges completely through said housing (12) from distal end (22) to distal end (26),
said housing (12) including a filter support (30) extending inwardly from said outlet end (18) to a rim (32) and defining a passage (34) aligned with said outlet connector (24), and
a second layer (50) sandwiched between said housing (12) and said conductive layer (28) and defining an extension (52) of said rim (32),
said housing (12) being thicker than said conductive layer (28) and thicker than said second layer (50).

2. An assembly as set forth in claim 1 wherein said filter support (30) includes a shoulder (36) for abutting a filter cartridge (38), said rim (32) being disposed closer to said outlet connector (24) than said shoulder (36) whereby said second layer (50) covered by said conductive layer (28) forms said extension (52).

3. A fuel filter assembly comprising;
a housing (12) having a peripheral wall (14) with an interior and an exterior and extending between an inlet end (16) and an outlet end (18),
said housing (12) including an inlet connector (20) integral with and extending from said inlet end (16) of said housing (12) to a distal end (22) and an outlet connector (24) integral with and extending from said outlet end (18) of said housing (12) to a distal end (26),
said housing (12) comprising an electrically non-conductive material, and
a layer (28) of electrically conductive material extending from said distal end (22) of said inlet connector (20) to said distal end (26) of said outlet connector (24) for conducting electrical charges completely through said housing (12) from distal end (22) to distal end (26),
said housing (12) being thicker than said conductive layer (28),
said housing (12) including a filter support (30) extending inwardly from said outlet end (18) to a rim (32) and defining a passage (34) aligned with said outlet connector (24),
said conductive layer (28) presenting a shoulder (36) about said filter support (30) for abutting a filter cartridge (38),
said conductive coating extending around said filter support (30) and said rim (32) and into said passage (34) of said filter support (30) and into said outlet connector (24) to said distal end (26) of said outlet connector (24),
a second layer (50) sandwiched between said housing (12) and said conductive layer (28), and
wherein said second layer (50) defines an extension (52) of said rim (32).

* * * * *